United States Patent
Blackbourn et al.

(10) Patent No.: US 10,920,131 B2
(45) Date of Patent: Feb. 16, 2021

(54) WEIGHTED ACID COMPOSITIONS COMPRISING AMINO ACIDS

(71) Applicant: SHELL OIL COMPANY, Houston, TX (US)

(72) Inventors: Robert Lawrence Blackbourn, Houston, TX (US); Jonathan Joseph Brege, Spring, TX (US); Paul Richard Weider, Houston, TX (US); Allen Dale Gabrysch, Paige, TX (US); Andrew James Murphy, Amsterdam (NL); Lorna Beatriz Ortiz-Soto, Houston, TX (US); Ryan Matthew Van Zanten, Houston, TX (US)

(73) Assignee: SHELL OIL COMAPNY, Houston, TX (US)

( * ) Notice: Subject to any disclaimer, the term of this patent is extended or adjusted under 35 U.S.C. 154(b) by 0 days.

(21) Appl. No.: 15/754,428

(22) PCT Filed: Aug. 29, 2016

(86) PCT No.: PCT/US2016/049264
§ 371 (c)(1),
(2) Date: Feb. 22, 2018

(87) PCT Pub. No.: WO2017/040405
PCT Pub. Date: Mar. 9, 2017

(65) Prior Publication Data
US 2018/0282613 A1    Oct. 4, 2018

Related U.S. Application Data

(60) Provisional application No. 62/212,305, filed on Aug. 31, 2015.

(51) Int. Cl.
*E21B 43/26* (2006.01)
*C09K 8/74* (2006.01)

(52) U.S. Cl.
CPC .................................. *C09K 8/74* (2013.01)

(58) Field of Classification Search
CPC .................................. E21B 43/26; C09K 8/74
See application file for complete search history.

(56) References Cited

U.S. PATENT DOCUMENTS

| | | | |
|---|---|---|---|
| 3,954,636 A | 5/1976 | Crowe et al. |
| 3,998,272 A | 12/1976 | Maly |
| 4,107,057 A | 8/1978 | Dill et al. |
| 4,371,443 A | 2/1983 | Keeney |
| 5,238,068 A | 8/1993 | Fredrickson |

(Continued)

FOREIGN PATENT DOCUMENTS

| | | |
|---|---|---|
| CN | 101358353 A | 2/2009 |
| WO | 2015030801 A1 | 3/2015 |
| WO | 2015069681 A1 | 5/2015 |

OTHER PUBLICATIONS

International Search Report and Written Opinion received for PCT Patent Application No. PCT/US2016/049264, dated Nov. 3, 2016, 10 pages.

(Continued)

*Primary Examiner* — Matthew R Buck

(57) ABSTRACT

A weighted acid composition comprising an acid, a brine, and an amino acid and associated methods.

13 Claims, 2 Drawing Sheets

(56) References Cited

U.S. PATENT DOCUMENTS

| | | | |
|---|---|---|---|
| 5,366,643 A | 11/1994 | Walker | |
| 5,531,934 A | 7/1996 | Freeman et al. | |
| 5,916,484 A | 6/1999 | Brezinski | |
| 6,192,987 B1 | 2/2001 | Funkhouser et al. | |
| 6,719,054 B2 | 4/2004 | Cheng et al. | |
| 8,505,626 B2 | 8/2013 | Nolte et al. | |
| 8,822,390 B2 | 9/2014 | Heath et al. | |
| 9,255,468 B2* | 2/2016 | Reyes | C09K 8/528 |
| 9,512,348 B2* | 12/2016 | Reyes | C09K 8/74 |
| 9,920,606 B2* | 3/2018 | Jiang | C09K 8/74 |
| 2008/0169102 A1* | 7/2008 | Carbajal | C09K 8/52 166/300 |
| 2011/0005760 A1* | 1/2011 | Hartman | C09K 8/76 166/308.1 |
| 2013/0213657 A1* | 8/2013 | Dobson, Jr. | C09K 8/86 166/308.5 |
| 2013/0264060 A1 | 10/2013 | De Wolf et al. | |
| 2014/0113843 A1* | 4/2014 | Shumway | C09K 8/524 507/261 |
| 2014/0296113 A1* | 10/2014 | Reyes | C09K 8/528 507/241 |
| 2015/0114647 A1* | 4/2015 | Jiang | C09K 8/74 166/305.1 |
| 2016/0177170 A1 | 6/2016 | Janak et al. | |
| 2017/0327735 A1 | 11/2017 | Belakshe et al. | |
| 2018/0156019 A1* | 6/2018 | Nguyen | C09K 8/72 |
| 2018/0171205 A1* | 6/2018 | Lewis | C04B 28/06 |
| 2018/0274348 A1* | 9/2018 | Karale | E21B 43/2405 |
| 2018/0282613 A1 | 10/2018 | Blackbourn et al. | |

OTHER PUBLICATIONS

El-Rabiee, "Corrosion Control of Vanadium in Aqueous Solutions by Amino Acids", Journal of Alloys and Compounds, Apr. 29, 2007, pp. 466-471.

Wu, "Inhibition Performance and Mechanism of Several Amino Acids in Acidic Media", Corrosion & Protection, vol. 33, Issue No. 5, May 15, 2012, p. 390(English Abstract only).

Xin, "Study on Corrosion Inhibition Mechanism of Aluminum by Aliphatic Amino Acids", Materials Protection, May 30, 2000, 2 pages( Title, English Abstract and paragraph 3.2).

Wenyan, Molecular Dynamics Simulation of Corrosion Inhibiting Mechanism of Iron by five Kinds of Amino Acids, Journal of Chinese Society for Corrosion and Protection, Dec. 15, 2011, 1 page(English Title & English Abstract Only).

\* cited by examiner

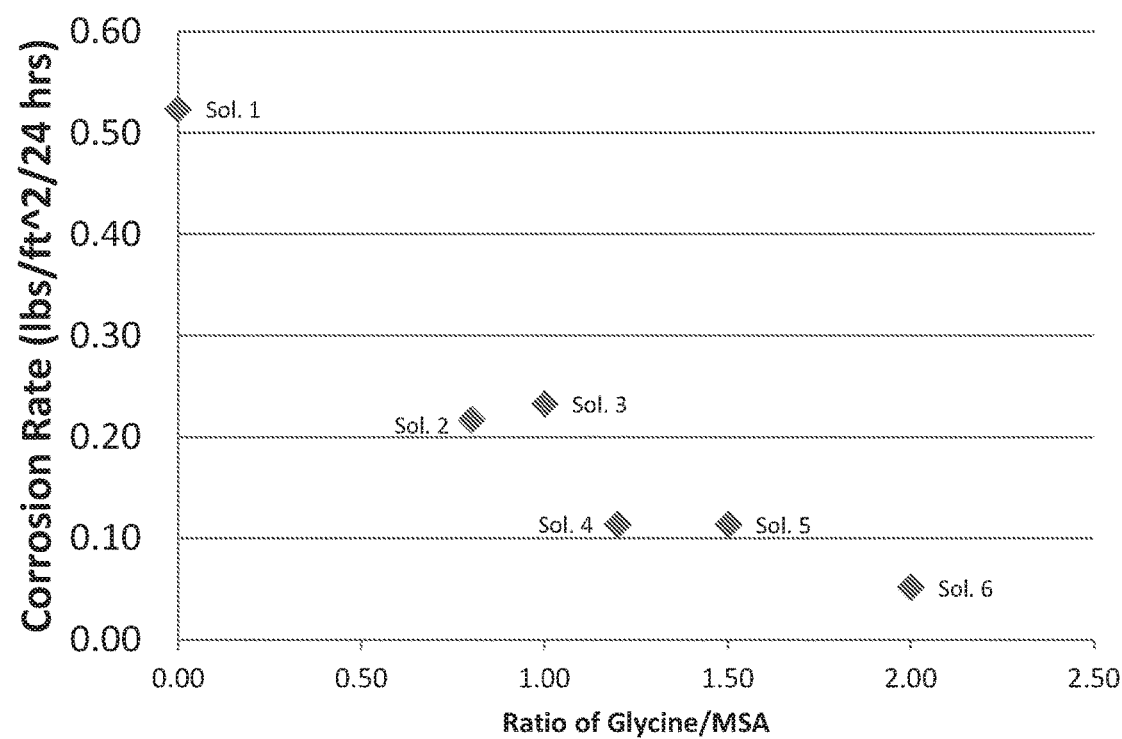

WEIGHTED ACID COMPOSITIONS COMPRISING AMINO ACIDS

CROSS-REFERENCE TO RELATED APPLICATIONS

The present application is the National Stage (§ 371) of International Application No. PCT/US2016/049264, filed Aug. 29, 2016, which claims priority from U.S. Provisional Application No. 62/212,305, filed Aug. 31, 2015 incorporated herein by reference.

BACKGROUND

The present disclosure relates generally to weighted acid compositions comprising amino acids. More specifically, in certain embodiments, the present disclosure relates to weighted acid compositions comprising amino acids suitable for use in acid stimulation treatments and associated methods.

Acid treatments using aqueous acidic solutions are commonly carried out in subterranean formations. These acid treatments may be carried out to accomplish a number of different purposes. Such purposes may include increasing or restoring the permeability of subterranean formations so as to facilitate the flow of oil and gas from the formation into the well and removing filter cake. The aqueous acidic solutions may also be used to remove formation damage along the hydrocarbon flow path and to create new flow paths within the matrix. The aqueous acidic solutions may also be used to remove a fluid loss control pill. Typically, these aqueous acidic solutions may be introduced into the wellbore or subterranean formation under pressure so that the aqueous acidic solution may flow into the wellbore or pore spaces of the formation. Examples of aqueous acidic solutions and methods of introducing aqueous acidic solutions into a subterranean formation are disclosed in U.S. Pat. Nos. 3,954,636, 3,998,272, 4,107,057, 4,371,443, 5,238,068, 5,366,643, 5,916,484, 6,192,987, and 6,719,054, the entireties of which are hereby incorporated by reference.

Aqueous acidic solutions used for downhole stimulation are often difficult to use as they may corrode metal tubular goods, pumps, and other equipment. The corrosion issue is especially problematic in high pressure wells, for example certain deepwater wells, because the hydrostatic needs require that the aqueous acidic solutions be weighted with a high density brine. The use of the high density brine may cause even a higher degree of corrosion than the aqueous acidic solution. In addition, such weighted aqueous acidic solutions are difficult to implement because they can precipitate unwanted by-products, such as insoluble calcium formates. Furthermore, the reaction rates of conventional aqueous acid solutions may be too fast limiting the coverage of the acid treatment. Premature breakthrough of the acid may cause an incomplete dissolution of the filter cake and the acid may be lost to where it first broke through.

Current methods to control corrosion in weighted acid systems are limited. Traditional inhibitors are often oily, film forming compounds that have adverse effects on the formation. These traditional inhibitors do not chelate either so the corrosion by-products that are formed often may cause further damage. Furthermore, in higher temperature applications, those above 250° F., conventional inhibitors for 13Cr metallurgy do not work, requiring operators to use more expensive and complicated metallurgy.

It is desirable to develop a method acidizing a wellbore or a subterranean formation using a weighted acid composition that does not suffer from any of these conventional drawbacks.

SUMMARY

The present disclosure relates generally to weighted acid compositions comprising amino acids. More specifically, in certain embodiments, the present disclosure relates to weighted acid compositions comprising amino acids suitable for use in acid stimulation treatments and associated methods.

In one embodiment the present disclosure provides a weighted acid composition comprising: an acid, a brine, and an amino acid.

In another embodiment, the present invention provides a method comprising: providing a weighted acid composition comprising an acid, a brine, and an amino acid and placing the weighted acid composition into a subterranean formation.

In another embodiment, the present invention provides a method comprising: providing a weighted acid composition comprising an acid, a brine, and an amino acid; placing the weighted acid composition into a subterranean formation; and allowing the weighted acid composition to acidize the subterranean formation.

BRIEF DESCRIPTION OF THE DRAWINGS

A more complete and thorough understanding of the present embodiments and advantages thereof may be acquired by referring to the following description taken in conjunction with the accompanying drawings.

FIG. 2 is a chart showing the rate of corrosion of metal coupons in various weighted acid compositions.

Figure 1:
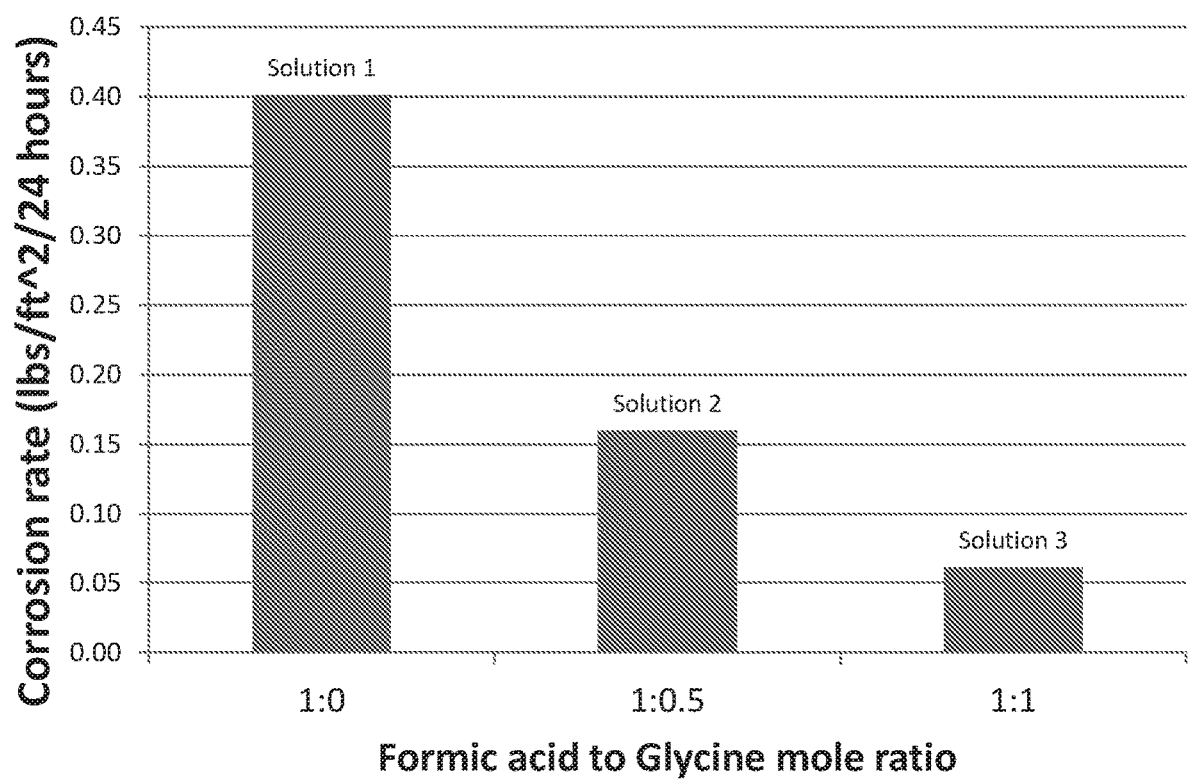
FIG. 1 is a chart showing the rate of corrosion of metal coupons in various weighted acid compositions.

The features and advantages of the present disclosure will be readily apparent to those skilled in the art. While numerous changes may be made by those skilled in the art, such changes are within the spirit of the disclosure.

DETAILED DESCRIPTION

The description that follows includes exemplary apparatuses, methods, techniques, and/or instruction sequences that embody techniques of the inventive subject matter. However, it is understood that the described embodiments may be practiced without these specific details.

The present disclosure relates generally to weighted acid compositions comprising amino acids. More specifically, in certain embodiments, the present disclosure relates to weighted acid compositions comprising amino acids suitable for use in acid stimulation treatments and associated methods.

Some desirable attributes of the compositions and methods discussed herein are that they may be much less corrosive to tubing, casing, and other equipment both on the surface and downhole than conventional systems. It has been discovered that the addition of the amino acid to a weighted acid composition reduces the corrosivity of the weighted acid composition to metals. Another desirable attribute of the compositions and methods discussed herein is that the amino acid may act as a chelating agent preventing the formation of precipitants. Another desirable attribute of the compositions and methods discussed herein is that the amino acid may act as a retarder slowing down the reaction rate of the weighted acid composition. Another desirable attribute of the compositions and methods discussed herein is that the addition of the amino acid to the weighted acid composition may remove filter cake better than a conventional weighted acid composition.

Without wishing to be limited to theory, it is believe that acid in the weighted acid composition may react with the amino acid to form a protonated amino acid. While the protonated amino acid is still a strong acid, it is less corrosive than the acid. It is also believed that the amino acid is capable of chelating cations through bonding with the nitrogen and carboxylic acid groups of any precipitants formed.

In certain embodiments, the present disclosure provides a weighted acid composition comprising an acid component, a brine component, and an amino acid component.

In certain embodiments, the acid component may comprise an acid solution comprising an organic acid, an inorganic acid, a sulfonic acid, an acid precursor, or any combination thereof. In certain embodiments, the organic acid may comprise formic acid, acetic acid, lactic acid, citric acid, glycolic acid, or any combination thereof.

In certain embodiments, the sulfonic acid may comprise a methane sulfonic acid, an α-hydroxysulfonic acid, or any combination thereof. In certain embodiments, the sulfonic acid may comprise any sulfonic acid described in WO2015069681, the entirety of which is hereby incorporated by reference.

In certain embodiments, the inorganic acid may comprise any inorganic acid. Examples of inorganic acids are hydrochloric, hydrofluoric, and phosphoric acid.

In certain embodiments, the acid precursors may comprise any acid precursor. Examples of suitable acid precursors include hydrolysable carboxylic acid esters, polylactic acid, polyglycolic acid, ethylene glycol di-formate, and any acid precursors described in WO2015069681.

In certain embodiments, the acid component may be present in the weighted acid composition in an amount in the range of from 0% to 40% by weight. In certain embodiments, the acid component may be present in the weighted acid composition in an amount in the range of from 5% to 25% by weight. In other embodiments, the acid component may be present in the weighted acid composition in an amount in the range of from 10% to 20% by weight.

In certain embodiments, the brine component may comprise any conventional brine used as a weighting agent for acidizing fluids. In certain embodiments, the brine component may comprise a base fluid and a salt. In certain embodiments, the base fluid may be water. In certain embodiments, the salt may comprise any monovalent or divalent salt or any combination thereof. In certain embodiments, the salt may comprise calcium chloride, zinc chloride, zinc bromide, calcium bromide, sodium chloride, sodium bromide, ammonium chloride, potassium bromide, potassium chloride or any combination thereof.

In certain embodiments, the brine component may be present in the weighted acid composition in an amount in the range of from 1% to 99.5% by weight. In certain embodiments, the brine component may be present in the weighted acid composition in an amount in the range of from 5% to 80% by weight. In certain embodiments, the brine component may be present in the weighted acid composition in an amount in the range of from 10% to 60% by weight. In certain embodiments, the brine component may be present in the weighted acid composition in an amount in the range of from 20% to 40% by weight. In certain embodiments, the brine component may be present in any amount in the weighted acid composition so long as the density of the weighted acid composition is greater than 9 pounds per gallons. In certain embodiments, the brine component may be present in any amount in the weighted acid composition so long as the density of the weighted acid composition is in the range of from 9 pounds per gallons to 16 pounds per gallons. In certain embodiments, the brine component may be present in any amount in the weighted acid composition so long as the density of the weighted acid composition is in the range of from 12 pounds per gallons to 14 pounds per gallons.

In certain embodiments, the amino acid component may comprise any amino acid or any combination thereof. Examples of suitable amino acids include alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, and any combination thereof.

In certain embodiments, the amino acid component may be present in the weighted acid composition in an amount in the range of from 0% to 30% by weight. In certain embodiments, the amino acid component may be present in the weighted acid composition in an amount in the range of from 5% to 25% by weight. In other embodiments, the amino acid component may be present in the weighed acid composition in an amount in the range of from 10% to 20% by weight.

In certain embodiments, the molar ratio of amino acid to inorganic or organic acid in the weighted acid composition may be ratio in the range of from 0:1 to 2:1. In certain embodiments, the molar ratio of amino acid to inorganic or organic acid in the weighted acid composition may be a ratio in the range of from 0.1:1 to 1.5:1. In other embodiments, the molar ratio of amino acid to inorganic or organic acid in the weighted acid composition may be a ratio in the range of from 0.5:1 to 1.1:1.

In certain embodiments, the weighted acid composition may further comprise a chelating component. In certain embodiments, the chelating component may comprise a chelating solution or a chelating agent. In certain embodiments, the chelating agent may be a bi-dentate, tri-dentate, or poly-dentate chelating agent. Examples of suitable chelating agents include ethylenediaminetetraacetic acid and its salts, L-glutamic acid, N,N-diacetic acid, tetra sodium salt (GLDA) and its various salts, and derivatives of ethylenediaminetetraacetic acid. In certain embodiments, the chelating agent may comprise an anion comprising at least one of ethylenediaminetetraacetic acid (EDTA), ethylenediamine tetra-methylene phosphonic acid (EDTMP), diethylenetriaminepentaacetic acid (DTPA), N-(hydroxyethyl)-ethylenediaminetriacetic acid (HEDTA), nitrilotriacetic acid (NTA), ethylenediamine-N,N'-disuccinic acid (EDDS), glycol-bis (2-aminoethylether)-N,N,N',N'-tetraacetic acid, 1,2-bis(o-aminophenoxy) ethane-N,N,N',N'-tetraacetic acid, iminodisuccinate acid, L-glutamic acid N,N-di acetic acid (GLDA), and methylglycinediacetic acid (MGDA).

In certain embodiments, the chelating component may be present in the weighted acid composition in an amount in the range of from 0% to 30% by weight. In certain embodiments the chelating component may be present in the weighted acid composition in an amount in the range of from 5% to 25% by weight. In other embodiments, the chelating component may be present in the weighted acid composition in an amount in the range of from 10% to 20% by weight. In other embodiments, the chelating component may be present in the weighted acid composition in an amount in the range of from 1% to 5% by weight.

In certain embodiments, the weighted acid composition may further comprise one or more conventional additives. Examples of conventional additives include corrosion inhibitors, surfactants, and wetting agents.

In certain embodiments, the weighted acid composition may further comprise an enzyme or an oxidizer to aid in the removal of the filtercake starches and polymers. Examples of suitable oxidizers include peroxides, persulfates, perborates, percarbonates, perphosphates, hyprochlorites, persilicates and hydrogen peroxide adducts such as urea hydrogen peroxide or magnesium peroxide. Other examples are coated oxidizers which release an oxidant when activated providing a delayed reaction. Examples of suitable enzymes include enzymes which can hydrolyze starch, xanthan, cellulose, guar, scleroglucan, succinoglycan or derivatives of these polymers.

In certain embodiments, the weighted acid composition may have a pH in the range of from 0 to 4. In certain embodiments, the weighted acid composition may have a pH in the range of from 0 to 2. In certain embodiments, the weighted acid composition may have a pH in the range of from 0 to 0.5. In certain embodiments, the weighted acid composition may have a pH in the range of from 0 to 0.25. In other embodiments, for example when the weighted acid composition comprises an acid precursor, the weighted acid composition may have a pH in the range of from 4 to 6.

In certain embodiments, the weighted acid composition may have a density above 9 pounds per gallon. In certain embodiments, the weighted acid composition may have density in the range of from 10 pounds per gallon to 16 pounds per gallon. In certain embodiments, the weighted acid composition may have a density above 16 pounds per gallon. In certain embodiments, the weighted acid composition may have a density in the range of from 13 pounds per gallon to 15 pounds per gallon.

In certain embodiments, the present disclosure provides a weighted acid composition comprising a base fluid, one or more salts, one or more acids, and one or more amino acids.

In certain embodiments, the base fluid may comprise water. In certain embodiments, the base fluid may be present in the weighted acid composition in an amount in the range of from 0.01% to 99% by weight of the weighted acid composition. In certain embodiments, the base fluid may be present in the weighted acid composition in an amount in the range of from 50% to 99% by weight of the weighted acid composition. In certain embodiments, the base fluid may be present in the weighted acid composition in an amount in the range of from 90% to 95% by weight of the weighted acid composition.

In certain embodiments, the one or more salts may comprise a single salt or a combination of salts. In certain embodiments, the one or more salts may any salt discussed above or any combination thereof.

In certain embodiments, the concentration of salt present in the weighted acid composition may be an amount in the range of up to 8 mol/L. In certain embodiments, the concentration of salt present in the weighted acid composition may be an amount in the range of from 2 mol/L to 8 mol/L. In certain embodiments, the concentration of salt present in the weighted acid composition may be an amount in the range of from 4 mol/L to 8 mol/L. In certain embodiments, the concentration of salt present in the weighted acid composition may be an amount in the range of from 6 mol/L to 8 mol/L.

In certain embodiments, the one or more acids may comprise a single acid or a combination of acids. In certain embodiments, the one or more acids may comprise any organic acid, inorganic acid, and/or acid precursor discussed above.

In certain embodiments, the concentration of the one or more acids present in the weighted acid composition may be an amount in the range of from 0.2 mol/L to 8 mol/L. In certain embodiments, the concentration of the one or more acids present in the weighted acid composition may be an amount in the range of from 0.4 mol/L to 6 mol/L. In certain embodiments, the concentration of the one or more acids present in the weighted acid composition may be an amount in the range of from 1 mol/L to 5 mol/L. In certain embodiments, the concentration of the one or more acids present in the weighted acid composition may be an amount in the range of from 2 mol/L to 4 mol/L.

In certain embodiments, the one or more amino acids may comprise a single amino acid or a combination of amino acids. In certain embodiments, the one or more amino acids may comprise any amino acid discussed above.

In certain embodiments, the concentration of amount amino acid present in the weighted acid composition may be an amount in the range of 0.05 mol/L to 16 mol/L. In certain embodiments, the concentration of amount amino acid present in the weighted acid composition may be an amount in the range of 1 mol/L to 12 mol/L. In certain embodiments, the concentration of amount amino acid present in the weighted acid composition may be an amount in the range of 2 mol/L to 8 mol/L. In certain embodiments, the concentration of amount amino acid present in the weighted acid composition may be an amount in the range of 4 mol/L to 6 mol/L.

In certain embodiments, the molar ratio of amino acid to acid in the weighted acid composition may be ratio in the range of from 0:1 to 2:1. In certain embodiments, the molar ratio of amino acid to acid component in the weighted acid composition may be a ratio in the range of from 0.25:1 to 2:1. In other embodiments, the molar ratio of amino acid to acid component in the weighted acid composition may be a ratio in the range of from 0.5:1 to 1:1.

In certain embodiments, the weighted acid composition may further comprise one or more chelating agents. In certain embodiments, the one or more chelating agents may comprise any chelating agent discussed above.

In certain embodiments, the concentration of chelating agent in the weighted acid composition may be an amount in the range of from 0.05 mol/L to 16 mol/L. In certain embodiments, the concentration of chelating agent present in the weighted acid composition may be an amount in the range of 1 mol/L to 12 mol/L. In certain embodiments, the concentration of chelating agent present in the weighted acid composition may be an amount in the range of 2 mol/L to 8 mol/L. In certain embodiments, the concentration of chelating agent present in the weighted acid composition may be an amount in the range of 4 mol/L to 6 mol/L.

In certain embodiments, the weighted acid composition may further comprise one or more conventional additives. Examples of conventional additives include corrosion inhibitors, surfactants, and wetting agents.

In certain embodiments, the weighted acid composition may have a pH in the range of from 0 to 4. In certain embodiments, the weighted acid composition may have a pH in the range of from 0 to 1. In certain embodiments, the weighted acid composition may have a pH in the range of from 0 to 0.5. In certain embodiments, the weighted acid composition may have a pH in the range of from 0 to 0.25. In other embodiments, for example when the weighted acid composition comprises an acid precursor, the weighted acid composition may have a pH in the range of from 4 to 6.

In certain embodiments, the weighted acid composition may have a density above 9 pounds per gallon. In certain embodiments, the weighted acid composition may have density in the range of from 9 pounds per gallon to 16 pounds per gallon. In certain embodiments, the weighted acid composition may have a density in the range of from 13 pounds per gallon to 15 pounds per gallon.

In certain embodiments, the present invention provides a method comprising: providing a weighted acid composition and placing the weighted acid composition into a subterranean formation.

In certain embodiments, the weighted acid composition may comprise any weighted acid composition discussed above. In certain embodiments, the subterranean formation may comprise any subterranean formation penetrated by a wellbore. In certain embodiments, the wellbore may comprise any conventional wellbore. Examples of conventional wellbores include onshore and offshore wellbores. In certain embodiments, the wellbore may be a deepwater wellbore.

In certain embodiments, the weighted acid composition may be placed into the subterranean by any conventional means. In certain embodiments, the weighted acid composition may be introduced into the wellbore as a high-pressure fluid.

In certain embodiments, the method may further comprise allowing the weighted acid composition to acidize a portion of the subterranean formation. In certain embodiments, the method may further comprise allowing the weighted acid composition to contact a filter cake present in the subterranean formation. In certain embodiments, the method may further comprise allowing the weighted acid composition to remove the filter cake. In certain embodiments, the method may further comprise allowing the acid precursor to generate an acid. In certain embodiments, the method may further comprises allowing the weighted acid composition to generate a protonated amino acid.

To facilitate a better understanding of the present invention, the following examples of certain aspects of some embodiments are given. In no way should the following examples be read to limit, or define, the scope of the invention.

EXAMPLES

Example 1—Formic Acid and Glycine

The corrosion rate of a 13Cr metal coupon in three different solutions was measured. Solution 1 comprised a 15 wt % solution of formic acid in a 17.5 pound per gallon brine of ZnBr2/CaBr2 with no glycine. Solution 2 comprised a 15 wt % solution of formic acid in a 17.5 pound per gallon brine of ZnBr2/CaBr2 with 1:0.5 mole ratio of formic acid to glycine. Solution 3 comprised a 15 wt % solution of formic acid in a 17.5 pound per gallon brine of ZnBr2/CaBr2 with 1:1 mole ratio of formic acid to glycine.

A 13Cr metal coupon was added to each of these solutions. The solutions were heated to 266° F. and the corrosion rates of the coupons were measured during a 24 hour period. FIG. 1 illustrates the corrosion rate for each of these coupons. As can be seen in FIG. 1, the rate of corrosion of the coupon in Solutions 2 and 3 were much less than the rate of corrosion of the coupon in Solution 1. Thus it was shown that the addition of the glycine to the brine comprising formic acid reduced resulted in a reduced rate of corrosion.

Example 2—Methane Sulfonic Acid and Glycine

The corrosion rate of a 13Cr metal coupon in six different solutions was measured. Solution 1 comprised an 18 wt % solution of methane sulfonic acid in 13 pound per gallon brine of ZnBr2/CaBr2 with no glycine. Solution 2 comprised an 18 wt % solution of methane sulfonic acid in 13 pound per gallon brine of ZnBr2/CaBr2 with 1:0.8 mole ratio of methane sulfonic acid to glycine. Solution 3 comprised an 18 wt % solution of methane sulfonic acid in 13 pound per gallon brine of ZnBr2/CaBr2 with 1:1 mole ratio of methane sulfonic acid to glycine. Solution 4 comprised an 18 wt % solution of methane sulfonic acid in 13 pound per gallon brine of ZnBr2/CaBr2 with 1:1.2 mole ratio of methane sulfonic acid to glycine. Solution 5 comprised an 18 wt % solution of methane sulfonic acid in 13 pound per gallon brine of ZnBr2/CaBr2 with 1:1.5 mole ratio of methane sulfonic acid to glycine. Solution 6 comprised an 18 wt % solution of methane sulfonic acid in 13 pound per gallon brine of ZnBr2/CaBr2 with 1:2 mole ratio of methane sulfonic acid to glycine.

A 13Cr metal coupon was added to each of these solutions. The solutions were heated to 266° F. and the corrosion rates of the coupons were measured. FIG. 2 illustrates the corrosion rate for each of these coupons. As can be seen in FIG. 2, the rate of corrosion of the coupon in Solutions 2, 3, 4, 5, and 6 were much less than the rate of corrosion of the coupon in Solution 1. Thus it was shown that the addition of the glycine to the brine comprising methane sulfonic acid reduced resulted in a reduced rate of corrosion.

Example 3—Formic Acid with Glycine Weighted Acid Treatment

The effectiveness of a weighted acid treatment fluid on a water based drill in fluid cake was evaluated. The rate at which 7% KCl flowed through a 100 and Berea disk was initially measured at 5 psi. A 15.0 lb/gal water based drill in fluid weighted with calcium carbonate deposited a filtercake over 16 hours at 265° F. with 300 psid to damage the disk. A weighted acid treatment fluid was placed on the filtercake and shut in to soak. The weight acid treatment fluid comprised 15 wt % formic acid with glycine in a 1:1 mol ratio with formic acid. The solution was weighted to a density of 14.4 lb/gal using ZnBr2/CaBr2 brine. After 7 days, the rate at which 7% KCl could flow through the disk was measured again. The regain flow as a percentage of initial flow was 90%. The filtercake was completely removed and the disk was free from any solids or precipitates.

Example 4—Weighted Formic Acid Treatment

The effectiveness of a weighted formic acid treatment fluid on a water based drill in fluid cake was evaluated. The rate at which DI water flowed through a 3 µm aloxite disk was initially measured at 5 psi. A 15.0 lb/gal water based drill in fluid weighted with calcium carbonate deposited a filtercake over 16 hours at 265° F. with 300 psid to damage the disk. A weighted formic acid treatment fluid was placed on the filtercake and shut in to soak. The weighted formic acid treatment fluid comprised 10 wt % formic acid weighted to a density of 15.2 lb/gal using ZnBr2/CaBr2 brine. After 7 days, the rate at which DI water could flow through the disk was measured again. The regain flow as a percentage of initial flow was 7%. The filtercake was completely removed however dark colored precipitates were observed on the surface of the disk.

Example 5—Weighted Formic Acid with Glycine Treatment

The effectiveness of a weighted formic acid with glycine treatment fluid on a water based drill in fluid cake was evaluated. The rate at which DI water flowed through a 3 μm aloxite disk was initially measured at 5 psi. A 15.0 lb/gal water based drill in fluid weighted with calcium carbonate deposited a filtercake over 16 hours at 265° F. with 300 psid to damage the disk. A weighted formic acid treatment fluid was placed on the filtercake and shut in to soak. The weighted formic acid treatment fluid comprised 10 wt % formic acid with glycine in a 1:1 mol ratio with formic acid weighted to a density of 14.8 lb/gal using ZnBr2/CaBr2 brine. After 7 days, the rate at which DI water could flow through the disk was measured again. The regain flow as a percentage of initial flow was 45%. The filtercake was completely removed and the disk was free from any solids or precipitates.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

That which is claimed is:

1. A method comprising:
   providing a weighted acid solution comprising an acid precursor, a brine, and an amino acid comprising glycine; and
   placing the weighted acid solution into a subterranean formation.

2. The method of claim 1, wherein the concentration of the acid precursor in the weighted acid solution is an amount in the range of from 0.2 mol/L to 8 mol/L.

3. The method of claim 1, wherein the brine comprises at least one of calcium chloride, zinc chloride, zinc bromide, calcium bromide, sodium chloride, and sodium bromide.

4. The method of claim 1, wherein the concentration of the brine in the weighted acid solution is an amount in the range of from 2 mol/L to 8 mol/L.

5. The method of claim 1, wherein the concentration of the amino acid in the weighted acid solution is an amount in the range of from 0.05 mol/L to 16 mol/L.

6. The method of claim 1, wherein the weighted acid solution has a molar ratio of amino acid to the acid precursor in the range of from 0.25:1 to 2:1.

7. The method of claim 1, further comprising allowing the weighted acid solution to generate a protonated amino acid.

8. The method of claim 1, wherein the acid precursor is selected from the group consisting of a hydrolysable carboxylic acid ester, a polylactic acid, a polyglycolic acid, and an ethylene glycol diformate.

9. The method of claim 1, wherein the acid precursor is a thermally activated strong acid precursor.

10. The method of claim 9, wherein the thermally activated strong acid precursor is selected from the group consisting of a sulfone adduct of butadiene, a sulfone adduct of piperylene, a sulfone adduct of isoprene, a sulfite ester, ethylene sulfite, dimethyl sulfite, 1,2-propylene sulfite, 1,3-propylene sulfite, a sulfone adduct of paraformaldehyde, a sulfone adduct of polyoxymethylene, a sulfone adduct of metaldehyde, a sulfone adduct of trioxane, a sulfone adduct of formaldehyde, a sulfone adduct of acetaldehyde, a sulfone adduct of propionaldehyde, a sulfone adduct of n-butyraldehyde, a sulfone adduct of i-butyraldehyde, a sulfone adduct of glycolaldehyde, a sulfone adduct of glyceraldehyde, a sulfone adduct of glyoxal, a sulfone adduct of benzaldehyde, a sulfone adduct of cyclohexanone, a sulfone adduct of acetone, a sulfone adduct of chloroacetone, a sulfone adduct of methyl ethyl ketone, a sulfone adduct of mesityl oxide, and a sulfone adduct of methyl i-butyl ketone.

11. A method comprising:
    providing a weighted acid solution comprising an acid precursor, a brine, and an amino acid; and
    placing the weighted acid solution into a subterranean formation;
    allowing the weighted acid solution to generate a protonated amino acid.

12. The method of claim 11, wherein said allowing the weighted acid solution to generate a protonated amino acid comprises comprise allowing the acid precursor to generate an acid and reacting said acid with the amino acid.

13. A method comprising:
    providing a weighted acid solution comprising an acid precursor, a brine, and an amino acid; and
    placing the weighted acid solution into a subterranean formation;
    wherein the acid precursor is a thermally activated strong acid precursor selected from the group consisting of a sulfone adduct of butadiene, a sulfone adduct of piperylene, a sulfone adduct of isoprene, a sulfite ester, ethylene sulfite, dimethyl sulfite, 1,2-propylene sulfite, 1,3-propylene sulfite, a sulfone adduct of paraformaldehyde, a sulfone adduct of polyoxymethylene, a sulfone adduct of metaldehyde, a sulfone adduct of trioxane, a sulfone adduct of formaldehyde, a sulfone adduct of acetaldehyde, a sulfone adduct of propionaldehyde, a sulfone adduct of n-butyraldehyde, a sulfone adduct of i-butyraldehyde, a sulfone adduct of glycolaldehyde, a sulfone adduct of glyceraldehyde, a sulfone adduct of glyoxal, a sulfone adduct of benzaldehyde, a sulfone adduct of cyclohexanone, a sulfone adduct of acetone, a sulfone adduct of chloroacetone, a sulfone adduct of methyl ethyl ketone, a sulfone adduct of mesityl oxide, and a sulfone adduct of methyl i-butyl ketone.

* * * * *